Oct. 11, 1932.    E. R. LLEWELLYN    1,881,749
SCREW THREAD LOCK
Filed Dec. 6, 1930
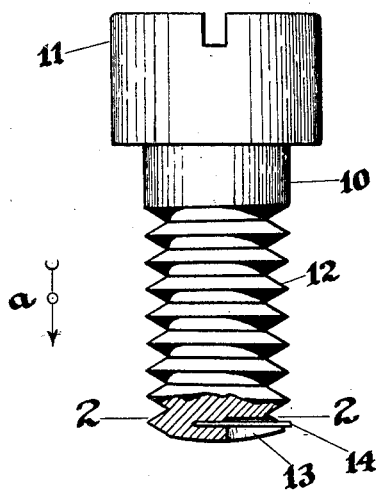
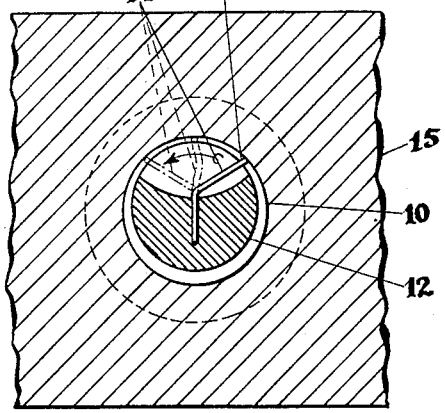
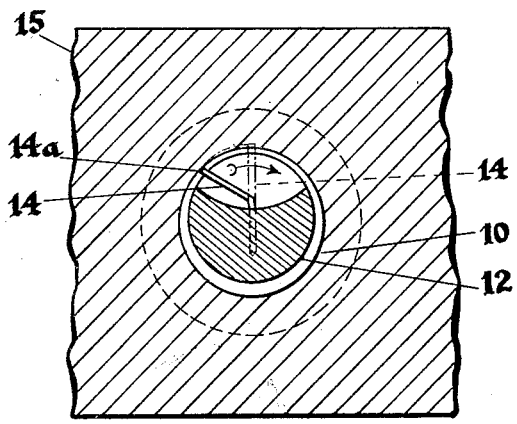
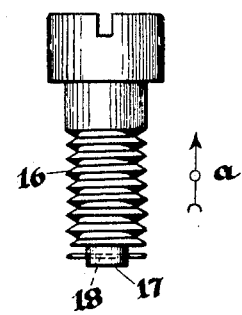
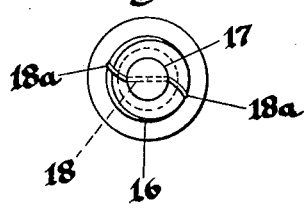
Inventor
Ernest R. Llewellyn Patented Oct. 11, 1932

1,881,749

UNITED STATES PATENT OFFICE

ERNEST R. LLEWELLYN, OF ARLINGTON, MASSACHUSETTS

SCREW THREAD LOCK

Application filed December 6, 1930. Serial No. 500,538.

This invention relates in general to means for preventing relative rotary motion in a given direction between two members and while not limited thereto is particularly adapted to externally and corelated internally threaded members.

Heretofore various means have been employed to retain threaded members in positive relation, each means having had its attendant disadvantages either in the manner of cost in manufacturing or utility in practice. Retaining two threaded members in position is difficult, due to the camming action of the thread which will, under vibration, cause a reverse or backing motion between the threaded members. Most methods for preventing this difficulty, other than the cost in manufacturing, in many instances require additional parts, as for example, the use of the so-termed jamb screw after the first screw has been positioned in a tapped hole.

To eliminate the above disadvantages I have provided the externally threaded member with a locking device that permits the rotating of the member in either direction but restrains contrawise movement to the rotated direction. This locking device may be applied to a screw thread without the necessity of special tools or special design of threads to accomplish the desired results. My present locking device being an improvement of my co-pending application, Serial No. 465,052.

The object of my present invention is to provide a simple and efficient thread lock to prevent contrawise movement that can be economically manufactured and applied to the standard form of threads.

With the above and other objects in view my invention consists in the novel application and arrangement of thread locking means hereinafter described and more specifically pointed out in the appended claims.

In the accompanying drawing I have illustrated my locking device in conjunction with a fillister head screw sufficient to enable those skilled in the art to understand the construction and operation thereof. While I have illustrated a particular type of screw it is not to be construed as limiting my device thereto as the application may be utilized in various designs and types of screws.

Referring to the drawing:—

Fig. 1 is a side view of a fillister head screw, the threaded portion being shown in partial section and having my locking device contained therein;

Fig. 2 is a transverse section taken substantially along line 2—2, Fig. 1, viewing in the direction of arrow $a$, same figure;

Fig. 3 is a view corresponding to Fig. 2 but shows the locking device in a different position;

Fig. 4 is a side view of a screw showing a modified construction and application of my locking device; and, Fig. 5 is a plan view of the locking device as shown at Fig. 4, viewing in direction of arrow $a$, same figure.

I have illustrated in the drawing, a fillister head screw 10 having an enlarged head 11 and threads 12 formed in the body portion thereof. A portion of the thread has formed therein a recess 13 into which projects a resilient locking pin 14, said pin being supported in the body portion of the screw. The pin 14 extends through the recess 13 and beyond the periphery of the threads, as shown by broken lines, Fig. 2. As the screw is turned in the internally threaded member 15, in the direction indicated by the arrow, Fig. 2, the pin 14 is flexed and assumes a position as illustrated by the full lines, the outer end 14a engaging with the root of the complemental internal thread formed in the member 15. The pin 14 in the position as shown by full lines Fig. 2, restrains the screw 10 from rotating in a direction opposite to that indicated by the arrow.

As the screw 10 is forced in the direction as indicated by the arrow, Fig. 3, the pin 14 is flexed substantially through a path as shown by the broken lines until it assumes the position as illustrated by the full lines, Fig. 3. This restrains the screw 10 from turning in a direction opposite to that indicated by the arrow.

At Fig. 4 I have shown a screw having a threaded body 16 with a turned portion 17 of less diameter than the root of the threads, this portion 17 may be formed as shown adjacent the threads or intermediate relative to the threads and body. The reduced portion 17 is provided with a transverse pin member 18 of greater length than the outside diameter of the threads, the outer ends 18a being adapted to engage with the root of the thread formed in the internally threaded member to restrain contrawise movement.

Having thus described my invention it will be evident to those skilled in the art that many changes and modifications may be made therein without departing from the spirit and scope thereof, therefore I do not wish to be limited to the specific details herein disclosed or limited in application to the conventional form of threaded screw as illustrated for convenience, but what I claim is:—

1. An internally threaded bore, an externally threaded member adapted to be engaged in said bore, a recess formed in the inner end portion of said threaded member, a radially movable resilient member supported in and normally disposed at right angles to the axis of said threaded member, said radial member being greater in length than the radius of said threaded member to engage said internally threaded bore.

2. An internally threaded bore, an externally threaded member adapted to be engaged in said bore, a recess formed in the inner end portion of said threaded member, said recess extending substantially to the axis of said member, a resilient member pivotally supported in said member adjacent said recess, and normally disposed at right angles to the axis of said threaded member and radially movable to opposed positions within said recess through engagement with said internally threaded bore.

3. An internally threaded bore, an externally threaded member adapted to be engaged in said bore, said member having a reduced body portion, a resilient member supported in said body portion, said resilient member having opposite projecting ends normally disposed at opposite angles to the axis of said threaded member to engage said threaded bore.

4. The combination with a member having an internally threaded bore, of an externally threaded member similarly threaded to engage the threads in said bore, said externally threaded member having a cut away portion adjacent the periphery thereof, a resilient element carried by said externally threaded member, said element being disposed transversely of the axis of said externally threaded member and extending through said cut away portion a sufficient distance to project beyond the radius of said internally threaded bore, said element being capable of bending on engagement with said bore to provide for free rotation of said externally threaded member in one direction but being adapted to bind against said internally threaded bore and thereby oppose rotation of the latter member in the opposite direction, whereby said element serves to retain said externally threaded member in said bore.

In testimony whereof I have hereunto set my hand.

ERNEST R. LLEWELLYN.